Sept. 1, 1931.  A. POUCHAIN  1,821,768
NEGATIVE ELECTRODE FOR ELECTRIC ACCUMULATORS
Filed June 4, 1928
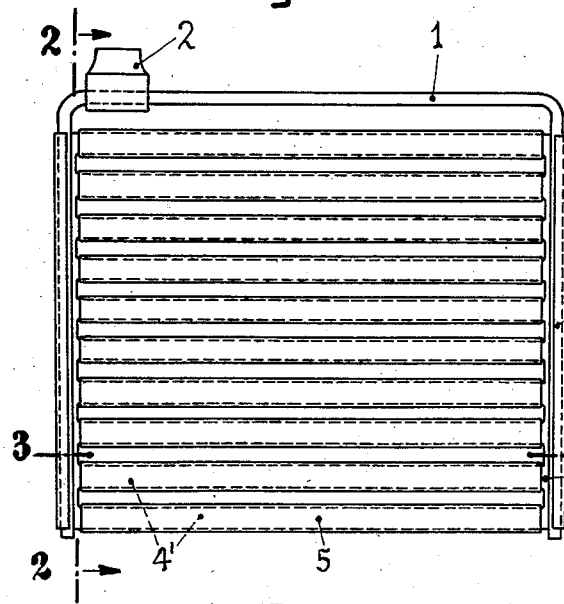
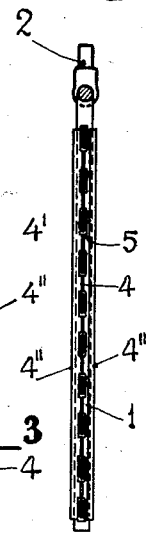
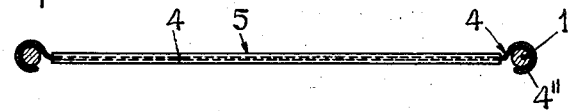
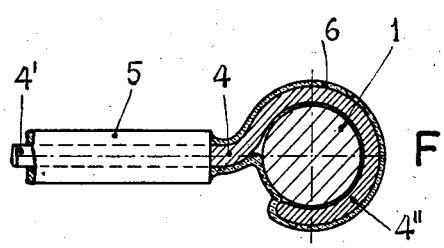
Inventor:
A. Pouchain.

Patented Sept. 1, 1931

1,821,768

UNITED STATES PATENT OFFICE

ADOLFO POUCHAIN, OF TURIN, ITALY

NEGATIVE ELECTRODE FOR ELECTRIC ACCUMULATORS

Application filed June 4, 1928, Serial No. 282,868, and in Germany January 10, 1928.

This invention relates to zinc electric accumulators and more particularly to negative electrodes for said accumulators, comprising elements connected in parallel with each other and with external circuit.

The negative electrode according to this invention comprises a support made of a metal which is a better conductor of electricity than zinc, and said support has zinc coatings in portions where zinc must be deposited during the charge of the accumulator, and an insulating coating at places where zinc must not be deposited, said support being thus permanently protected against contact with electrolyte.

On the annexed drawings is shown by way of example an embodiment of a negative electrode in accordance with this invention and Figure 1 is a front view of a negative electrode, Figure 2 is a vertical section on line 2—2 of Fig. 1;

Figure 3 is a horizontal section on line 3—3 of Fig. 1;

Figure 4 is a fragmentary section to an enlarged scale on line 4—4 of Fig. 1.

In said figures, 1 is a three-sided or inverted U-shaped frame on the top member of which is fastened an attachment 2 for connection with outer circuit.

Said frame is made of a material which is a good conductor of electricity and preferably a better one than zinc, and it carries a zinc-covering supporting member.

Said support consists, in the preferred embodiment, of a sheet metal plate 4 which is cut to provide parallel stripes or bands 4', and said plate is fastened on the frame 1 by wrapping the edges of said plate on the side members of said frame, as shown by 4".

Of course, said support plate is made of a metal which is a good conductor of electricity, and preferably is a better conductor than zinc.

Each band 4'; which forms an element of the negative electrode, is covered by a layer 5 of amalgamated zinc which may be obtained either by electrolytic deposition or by wrapping a strip of zinc on each band 4', or in any other manner.

The portions of the plate 4 which are not to be covered with zinc and the members of the frame 1 are insulated from electrolyte preferably by means of a layer 6 of an insulating varnish say a rubber or celluloid varnish.

The zinc layer on the bands 4' providing the electrode is not required to cover the whole surface of the electrode; in electrodes intended to be located at the ends of the set of electrodes of the accumulator it is useful that the electrode faces opposite to the cell walls are not provided with zinc and then they are covered with insulating varnish.

In any event the metal of plate 4 or of frame 1, which may be made of brass or copper, preferably with a silver coating, is never in direct contact with electrolyte.

Then the zinc deposit which is formed during the charge of the accumulators forms on the zinc only and no other metal is in contact with zinc and exposed to electrolyte, this feature preventing the formation of possible local couples which would arise should zinc be deposited on another metal; therefore zinc is not subject to consumption when the circuit is open.

The support for the zinc deposit which in the above example is provided by the assembly of bands 4' of the plate 4, could also be provided in different manner, say by wires, rods or other pieces supported in any manner by a frame of the kind of frame 1 or of another kind.

The formed electrode, that is the electrode after the surface of the plate 4—4' is covered in part with zinc and in part with an insulating layer, is coated with a solution of sodium silicate and arabic gum, this solution providing thereon, after dried, a film which protects the electrode and enables it to remain unaltered during storing, and said film dissolves in the electrolyte at the time of use, it producing a favourable action on the operation of the accumulator.

What I claim as my invention and desire to secure by United States Letters Patent is:—

1. A negative electrode for zinc electric accumulators comprising a support made of a metal other than zinc, and an adherent layer covering the whole surface of said support, a portion of said layer being of zinc and the remaining portion being of an insulating substance.

2. A negative electrode for zinc electric accumulators comprising a support made of a metal which is a better conductor of electric current than zinc, and an adherent layer covering the whole surface of said support, a portion of said layer of zinc and the remaining portion being of an insulating substance.

3. A negative electrode for zinc accumulators comprising a support made of a metal other than zinc, and an adherent layer covering the whole surface of said support, said layer consisting of zinc in regions where zinc is to be deposited during the charge of the accumulator and of insulating material in regions where a zinc deposit is undesired.

4. A negative electrode for zinc electric accumulators comprising a support made of a metal other than zinc, and an adherent layer covering the whole surface of said support, said layer consisting of an electrolytic deposit of zinc in regions where zinc is to be deposited during the charge of the accumulator and of insulating material in regions where a zinc deposit is undesired.

5. A negative electrode for zinc electric accumulators comprising a support made of a metal other than zinc, and an adherent layer covering the whole surface of said support, said layer consisting of zinc in regions where zinc is to be deposited during the charge of the accumulator and of a layer of an insulating varnish in regions where a zinc deposit is undesired.

6. A negative electrode for zinc electric accumulators comprising a support made of a metal other than zinc, and an adherent layer covering the whole surface of said support, a portion of said layer being of zinc and the remaining portion being of an insulating substance, and a film of a solution of gum and sodium silicate on the whole electrode.

7. A negative electrode for zinc electric accumulators comprising a frame of a metal other than zinc, a plate mounted in said frame, said plate being of a metal other than zinc and being slotted to provide interconnected stripes, a layer of zinc covering said stripes, and an insulating layer covering the whole surface of frame and plate which is deprived of said zinc layer.

8. A negative electrode for zinc accumulators comprising a frame of a metal other than zinc, a plate mounted in said frame, said plate being of a metal other than zinc and being slotted to provide interconnected stripes, a layer of zinc covering said stripes, and an insulating layer covering the whole surface of frame and plate which is deprived of said zinc layer, and a film of a solution of gum and sodium silicate on the whole electrode.

In testimony whereof I have signed my name to this specification.

ADOLFO POUCHAIN.